(No Model.)
A. LINDGREN.
CULTIVATOR.
No. 455,755. Patented July 14, 1891.
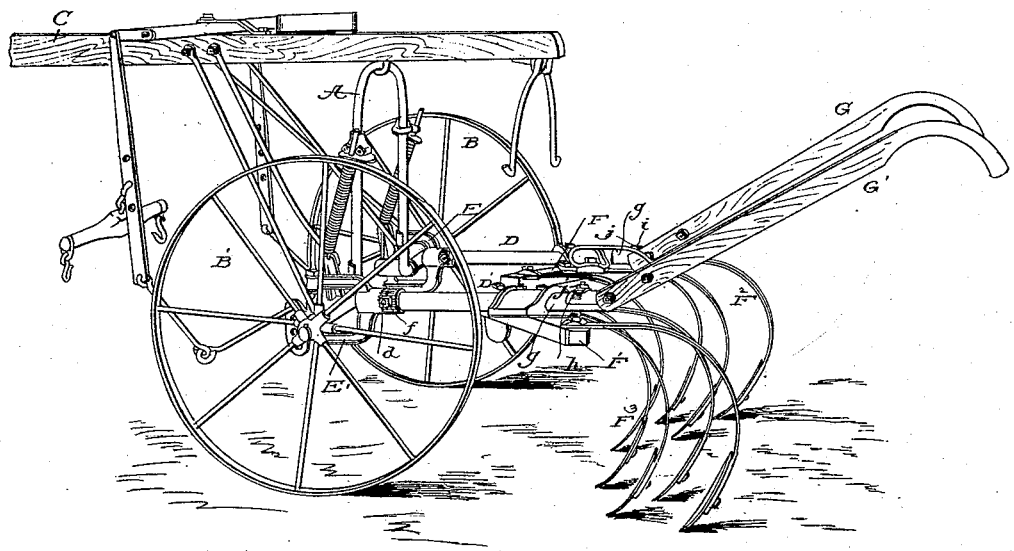
Fig. 1.
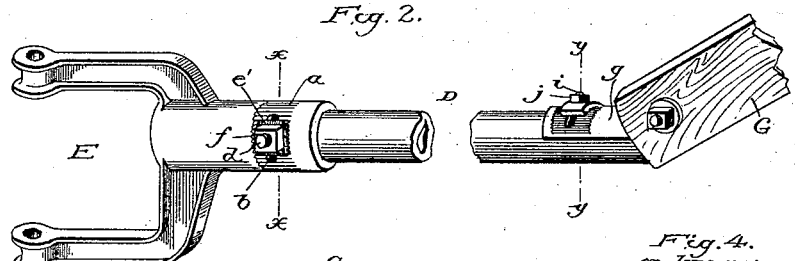
Fig. 2.
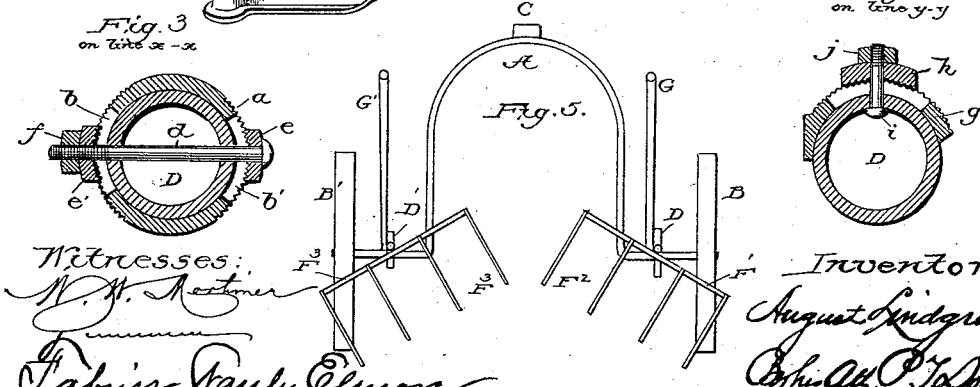
Fig. 3 on line x-x.
Fig. 5.
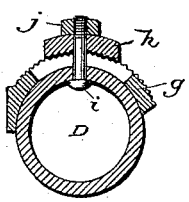
Fig. 4 on line y-y.
Witnesses:
Inventor:
August Lindgren
THE NORRIS PETERS CO., PHOTO-LITHO., WASHINGTON, D. C.

UNITED STATES PATENT OFFICE.

AUGUST LINDGREN, OF MOLINE, ILLINOIS, ASSIGNOR TO THE MOLINE PLOW COMPANY, OF SAME PLACE.

CULTIVATOR.

SPECIFICATION forming part of Letters Patent No. 455,755, dated July 14, 1891.

Application filed November 15, 1890. Serial No. 371,500. (No model.)

*To all whom it may concern:*

Be it known that I, AUGUST LINDGREN, of Moline, in the county of Rock Island and State of Illinois, have invented certain Improvements in Cultivators, of which the following is a specification.

This invention relates more particularly to that class of wheeled straddle-row cultivators in which the wheel-frame is provided with laterally and vertically swinging beams, each carrying a gang of teeth or shovels, and a handle through which it is controlled and guided by the operator walking behind the machine.

The object of the invention is to provide for the adjustment of the gangs from horizontal to laterally-inclined positions in order to adapt the machine for operating on listed corn or side-hills and in other exceptional places.

To this end the invention consists, mainly, in so connecting the beams to the draft heads or couplings at their front that they may be tipped or rocked laterally each around its longitudinal axis without changing the position or action of the couplings, in handles so connected to the beams that they may be maintained in their upright operative positions notwitstanding the rotary adjustment of the beams, and in minor details hereinafter pointed out.

In the accompanying drawings, Figure 1 is a perspective view of my improved cultivator. Fig. 2 is a perspective view on a larger scale, showing one of the cultivator-beams, its draft-connections, and handle. Fig. 3 is a cross-section on the line $x\ x$ of Fig. 2. Fig. 4 is a cross-section on the line $y\ y$ of Fig. 2. Fig. 5 is a rear elevation of the machine, illustrating the manner in which the gangs are tilted.

Referring to the drawings, A represents an arched axle having its ends projected horizontally and sustained in ground-wheels B B'.

C is a draft-pole or tongue connected rigidly to the axle and provided with suitable draft-connections in the ordinary manner.

D D' represent two beams or drag-bars, each attached at the forward end to a forked draft-head E, connected by vertical pivots $e$ to a sleeve $e'$, mounted to turn upon the axle. This sleeve and the forked head E constitute jointly what is known as a "draft-head" or "coupling," allowing the beam to be swung both laterally and vertically in the ordinary manner. Each beam is provided near its rear end with a cross bar or head F, bolted or otherwise attached rigidly thereto and carrying a series of teeth or standards F' F², &c., having shovels or blades at their lower ends, as usual.

The construction and mode of attachment of the cross-bars and standards form no part of my invention. They may be of any ordinary or approved form.

G G' represent two handles attached one to the rear end of each beam.

In their general construction and mode of operation the foregoing parts resemble those in general use. The construction differs, however, from that heretofore in use in the manner following: The beam D, instead of being attached, as usual, immovably to the draft-head E, is made of round form at the forward end and seated in a hole or socket in the head, so that it may be rotated therein, the effect of this rotation being to give the cross-bar F and shovels connected therewith, commonly known as the "gang," a lateral inclination, as illustrated in Fig. 5, so that the shovels in each gang, standing at different heights, are adapted to operate on inclined surfaces. The forward end of the beam is secured by means of a bolt $d$, passed transversely therethrough and through vertical slots $b$ in the draft-head, the upper ends of the bolts being provided with washers $e$ and $e'$, having their inner surface serrated to engage corresponding serrations $a$ in the outer surface of the draft-head. The bolt is provided with a tightening-nut $f'$ on one end, whereby the parts are drawn firmly together, so as to hold the beam against rotation in its adjusted position. By loosening the nuts $f'$ the parts are set free, so that the beam may be turned to the right or left until the shovels assume the required positions.

It is to be particularly noted that the beam may be adjusted without changing the position of the draft-head whose axes remain in their original vertical and horizontal positions. As the rotation of the beam has the effect of throwing the rear end of the handle to the right or left, I provide connections by which the handle may receive a rotary adjustment in relation to the beam, so as to remain at all times in a vertical position. As shown in Figs. 2 and 4, this connection consists of a concave plate $g$, fixed rigidly to the handle and seated on top of the beam, to which it is secured by a vertical bolt $i$, passing from the interior of the beam through a transverse slot in the plate $g$, and carrying at its upper end a washer $h$, serrated to engage the plate $g$, and held in place by a nut $J$. It will be observed that this connection admits of the plate $g$ being turned around the beam to a limited extent to the right and left.

While I prefer to employ, as herein shown, a round tubular beam, it is to be understood that beams of other forms in cross-section may be employed and that the connections at their ends may be modified provided only that the beam is adapted to be turned in relation to the draw-head and fixed in position and that the handle is adapted to be turned and fixed upon the beam.

Having thus described my invention, what I claim is—

1. In a cultivator, a wheeled frame, draft-heads jointed thereto to swing vertically and laterally, a shovel-carrying beam jointed to the draft-head to turn around a longitudinal axis without changing the position of the head, and means for securing the beam in its different relations to the head, whereby the shovels may be given a lateral inclination without affecting the movement of the beams.

2. In a cultivator, a wheeled frame and a draft-head jointed thereto to swing vertically and laterally, in combination with a shovel-carrying beam jointed to the head to rotate about its longitudinal axis, means for fastening the beam to the head, a guiding-handle, and devices connecting the handle to the beam and permitting its rotary adjustment thereto in a lateral direction.

3. In a cultivator, a wheeled frame and a draft-head jointed thereto to swing vertically and laterally, in combination with a shovel-carrying beam having its forward end seated and arranged to revolve within the head around a longitudinal axis, and a transverse bolt and clamping devices to hold the beam in position.

4. In a wheeled cultivator, a shovel-carrying beam revoluble about its longitudinal axis, in combination with a guiding-handle, the handle-carrying plate $g$, and the clamping-bolt connecting the same with the beam.

In testimony whereof I hereunto set my hand, this 16th day of September, 1890, in the presence of two attesting witnesses.

AUGUST LINDGREN.

Witnesses:
W. V. RICHARDS,
M. G. MARONEY.